United States Patent
Cox

[19]

[11] Patent Number: 6,079,673
[45] Date of Patent: Jun. 27, 2000

[54] TRANSMISSION LINE HANGER

[75] Inventor: Albert R. Cox, Orland Park, Ill.

[73] Assignee: Andrew Corporation, Orland Park, Ill.

[21] Appl. No.: 09/283,793

[22] Filed: Apr. 1, 1999

[51] Int. Cl.$^7$ ....................................................... F16L 3/00
[52] U.S. Cl. .......................... 248/63; 174/40 R; 248/74.1
[58] Field of Search ................................. 248/63, 65, 73, 248/74.1, 74.2, 74.4; 174/40 R

[56] References Cited

U.S. PATENT DOCUMENTS

| | | | |
|---|---|---|---|
| 2,397,680 | 4/1946 | Morehouse | 248/74 |
| 2,682,385 | 6/1954 | Schluter | 248/262 |
| 2,716,703 | 8/1955 | Kane | 250/33.52 |
| 2,941,768 | 6/1960 | Elms et al. | 248/71 |
| 3,131,447 | 5/1964 | Tinnerman | 24/81 |
| 3,154,281 | 10/1964 | Frank | 248/201 |
| 3,237,905 | 3/1966 | Baker et al. | 248/361 |
| 3,336,543 | 8/1967 | Johnson et al. | 333/95 |
| 3,345,706 | 10/1967 | Stokes | 24/73 |
| 3,346,863 | 10/1967 | Siebold | 348/702 |
| 3,444,596 | 5/1969 | Soltysik | 24/73 |
| 3,501,117 | 3/1970 | Soltysik | 248/71 |
| 3,822,411 | 7/1974 | Merle | 333/95 A |
| 4,047,133 | 9/1977 | Merle | 333/95 A |
| 4,194,380 | 3/1980 | Brown et al. | 72/64 |
| 4,334,659 | 6/1982 | Yuda | 248/73 |
| 4,505,006 | 3/1985 | Andre | 24/16 PB |
| 4,526,428 | 7/1985 | Sachs | 339/14 R |
| 4,540,959 | 9/1985 | Saad | 333/21 R |
| 4,572,466 | 2/1986 | Yamaguchi et al. | 248/73 |
| 4,642,585 | 2/1987 | Saad | 333/21 R |
| 4,654,612 | 3/1987 | Smith | 333/248 |
| 4,763,132 | 8/1988 | Juds et al. | 343/890 |
| 4,813,639 | 3/1989 | Midkiff et al. | 248/68.1 |
| 4,958,792 | 9/1990 | Rinderer | 248/74.2 |
| 5,167,533 | 12/1992 | Rauwolf | 439/583 |
| 5,334,051 | 8/1994 | Devine et al. | 439/583 |
| 5,393,021 | 2/1995 | Nelson | 248/71 |
| 5,794,897 | 8/1998 | Jobin et al. | 248/74.4 |
| 5,971,663 | 10/1999 | Brothers | 248/73 X |
| 5,984,723 | 11/1999 | Wild | 439/583 |

FOREIGN PATENT DOCUMENTS

| | | |
|---|---|---|
| 1000677 | 11/1976 | Canada . |
| 168882 | 10/1959 | Denmark . |
| 9707600 | 7/1997 | European Pat. Off. . |
| 710034 | 7/1941 | Germany . |
| 6912883 | 3/1969 | Germany . |
| 2807119 | 8/1979 | Germany . |
| 1062633 | 3/1967 | United Kingdom . |
| WO95/31027 | 11/1995 | WIPO . |

OTHER PUBLICATIONS

ICESCo™ Accessories article entitled Universal Snap–In Hangers for Wireless Applications.

Primary Examiner—Ramon O. Ramirez
Attorney, Agent, or Firm—Jenkens & Gilchrist

[57] ABSTRACT

A transmission line hanger is provided for attaching a corrugated transmission line to a supporting structure. The hanger includes a first section adapted to engage a first side of the transmission line and a second section adapted to engage a second side of the transmission line. The first and second sections define an inner generally cylindrical the gripping ribs forms a protrusion extending radially inward from the inner generally cylindrical surface. The gripping ribs are spaced to fit into corresponding recesses in the corrugated outer surface of the transmission line.

In another embodiment, the hanger further includes a snap clasp having two elements. The first element is a lip on the exterior of the hanger. The second element is a latch having three sides.

In still another embodiment, the hanger includes a first alignment pin and a first mating recess on the fist section and a second alignment pin and a second mating recess on the second section. The first recess being adapted to receive the second alignment pin and the first alignment pin being adapted to fit in the second mating recess to align the first section with the second section.

42 Claims, 8 Drawing Sheets

TRANSMISSION LINE HANGER

FIELD OF THE INVENTION

This invention relates generally to transmission lines, such as, corrugated coaxial cables, and in particular to transmission line hangers for supporting corrugated transmission lines used in antenna systems.

BACKGROUND OF THE INVENTION

Transmission line hangers are used to support transmission lines. In most uses, transmission lines are attached to a plurality of supporting structures along most of their lengths by a plurality of transmission line hangers. The most extensive use of hangers is in connection with coaxial cables, such as those disclosed in U.S. Pat. No. 5,334,051 (Devine et al.) and U.S. Pat. No. 5,167,533 (Rauwolf). Coaxial cables are extensively used for carrying electromagnetic signals.

Transmission line hangers are used for supporting coaxial cables mounted on tall towers and along horizontal bridges. Hanger failure presents both functional and safety issues of a very serious nature. A variety of mounting and support means for coaxial cables have been disclosed in the prior art. For example, U.S. Pat. No. 4,813,639 (Midkiff et al.) discloses a cluster mounting system for supporting two or more coaxial cables.

Hanger stress is a continuing problem for prior cable hangers. Many cable hangers are made of plastic. However, prior plastic cable hangers generally do not have the ability to accommodate a range of transmission line diameters. Prior designs include two identical and opposing plastic hanger halves that are joined at a mating plane. In these prior designs, as the cable diameter exceeds the inside diameter of the assembled plastic hanger, the hanger halves are forced apart at the mating plane. As the cable diameter increases, the stresses in the plastic hanger increase. Similar stress are created when the cable is bent using the hanger as a fulcrum. These stresses cause the plastic to deform over time. Contributing to the stresses causing deformation are the imbedded stresses that are inherent in the molding process itself. These imbedded stresses tend to work in the same direction as the stresses caused by deformation. All of the combined stresses force these prior hangers open at the mating plane which cause the hangers to lose their grip on the subject cable. The adverse effect of all of these stresses is amplified and accelerated by environmental conditions and changes such as heat, cold and humidity. This is significant because cable hangers are typically used outdoors in such environmental conditions.

Longitudinal movement of the cable with respect to the hanger is another continuing problem. Typically, the cable jacket is made of plastic. The polyethylene typically used for cable jackets is a material that has an inherent lubricant quality. In addition, the cable jacket can "cold flow" which reduces the holding force of the cable hanger over time, resulting in cable slippage.

U.S. Pat. No. 5,794,897 (Jobin et al.) discloses a cable hanger that addresses some of the above problems. This hanger clamps two parallel cables at once and includes two opposing elements each having two posts and two openings for aligning the two elements when they are placed around the transmission lines. Once aligned, the two elements are brought toward each other until they snap together to form a clamping structure which loosely grips the transmission lines. The clamping structure can then be slid to the desired location on the transmission lines. A bolt, screw or similar threaded member is then inserted through the aligned bolt or screw openings in the two elements and through the supporting structure. Finally, the bolt, screw or similar threaded member is tightened to securely clamp the opposing elements to the transmission lines and to attach the resulting hanger to the supporting structure. A plurality of randomly spaced notches extend along the inside of the elements to firmly clamp the transmission lines and reduce cable slippage.

FIG. 1 illustrates one half of a representative prior art cable hanger that includes a plurality of randomly spaced ribs or notches 5 that protrude from the interior surface of each cable hanger halve to better clamp the exterior of the transmission line. However, the ribs 5 in these prior hangers are not spaced to fit into the recesses of the corrugated cable. Instead, the ribs 5 are spaced a random distance apart along the interior surface of the cable hanger. Therefore, one or more of these ribs 5 typically fall on a corrugation crest and thus force the hanger halves apart. Moreover, ribs that are randomly spaced apart along the interior surface of a cable hanger limit the diameter range such a hanger can accommodate.

Prior hanger designs can only effectively accommodate one diameter transmission line. In these designs, the inner hanger diameter is sized for the smallest cable diameter the hanger is designed to hold. A cable approximately two percent larger than the inner hanger diameter will deflect the two hanger halves enough to cause hanger deformation. Since most of the prior designs do not include a limiting device (such as a snap clasp), the plastic will eventually distort beyond the limits of its basic configuration thus causing the hanger to lose its hold on the cable thereafter.

Furthermore, the installation of prior transmission line hangers is often a difficult and time-consuming operation because of the large amount of auxiliary hardware required to install these prior hangers. Therefore, there is a continuing need for effective, inexpensive hangers and for improved methods of installing them. The present invention includes several unique features that address these continuing needs by providing a transmission line hanger that minimizes the clamping stress between the hanger and the transmission line, inhibits hanger deformation, reduces longitudinal movement of the transmission line with respect to the hanger, allows a range of corrugated transmission line diameters to be accommodated, and facilitates easy installation.

SUMMARY OF THE INVENTION

A transmission line hanger is provided for attaching a corrugated transmission line to a supporting structure. The hanger includes a first section adapted to engage a first side of the transmission line and a second section adapted to engage a second side of the transmission line. The first and second sections define an inner generally cylindrical surface that includes two gripping ribs disposed at respective ends of the hanger. Each of the gripping ribs forms a protrusion extending radially inward from the inner generally cylindrical surface. The gripping ribs are spaced to fit into corresponding recesses in the corrugated outer surface of the transmission line.

In another embodiment, the hanger further includes a snap clasp having two elements. The first element is a lip on the exterior of the hanger. The second element is a latch having three sides.

In still another embodiment, the hanger includes a first alignment pin and a first mating recess on the fist section and a second alignment pin and a second mating recess on the second section. The first recess being adapted to receive the second alignment pin and the first alignment pin being adapted to fit in the second mating recess to align the first section with the second section.

BRIEF DESCRIPTION OF THE DRAWINGS

Other objects and advantages of the invention will become apparent upon reading the following detailed description and upon reference to the drawings in which.

OVERVIEW OF THE INVENTION

Figure 1:
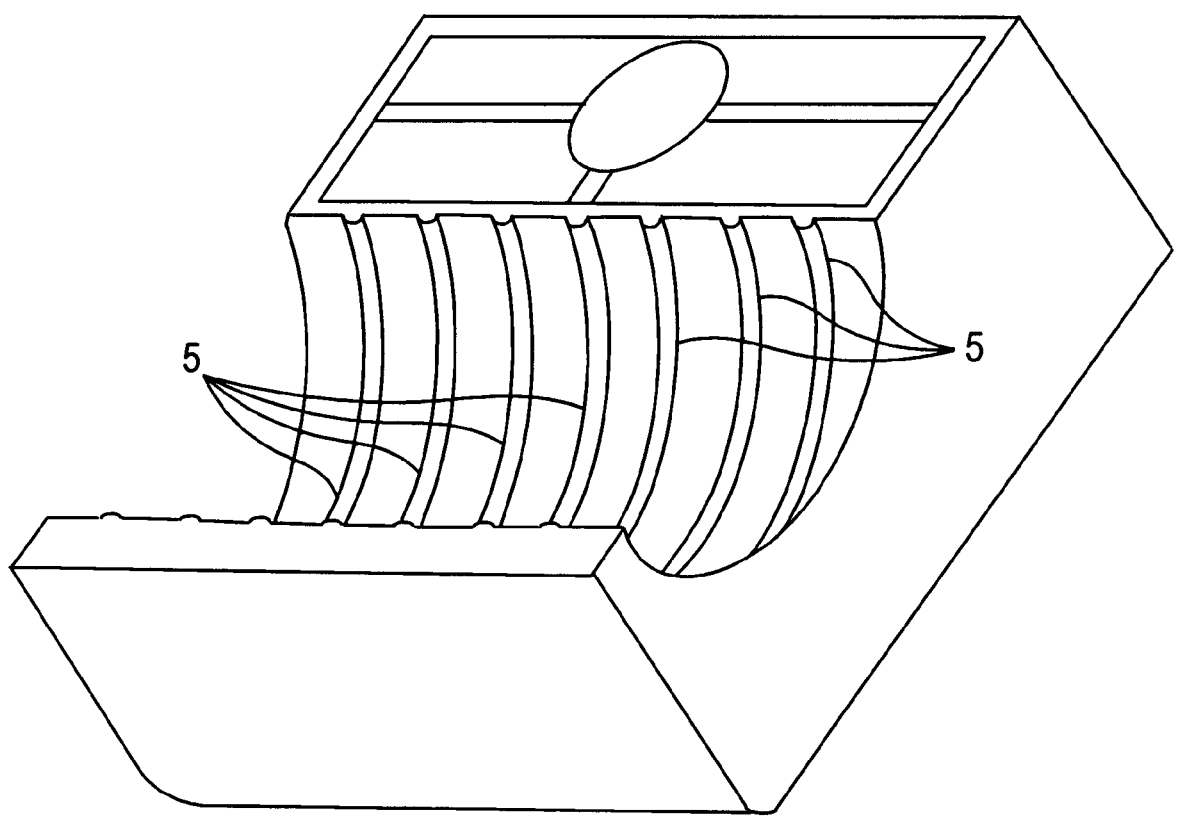
FIG. 1 is a perspective view of one half of a prior art cable hanger.
Figure 2:
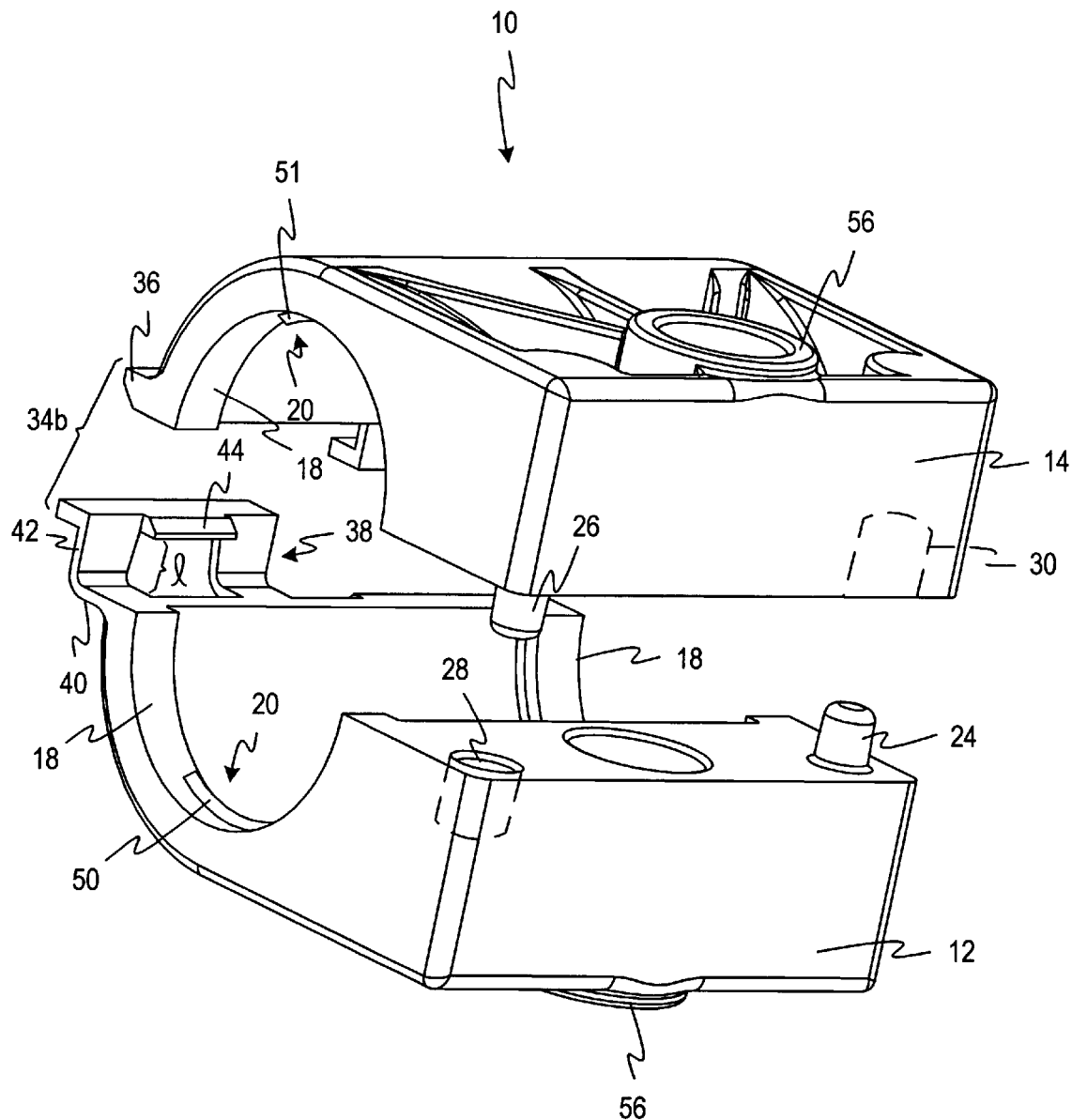
FIG. 2 is a perspective exploded view of a hanger according to the present invention.
Figure 3:
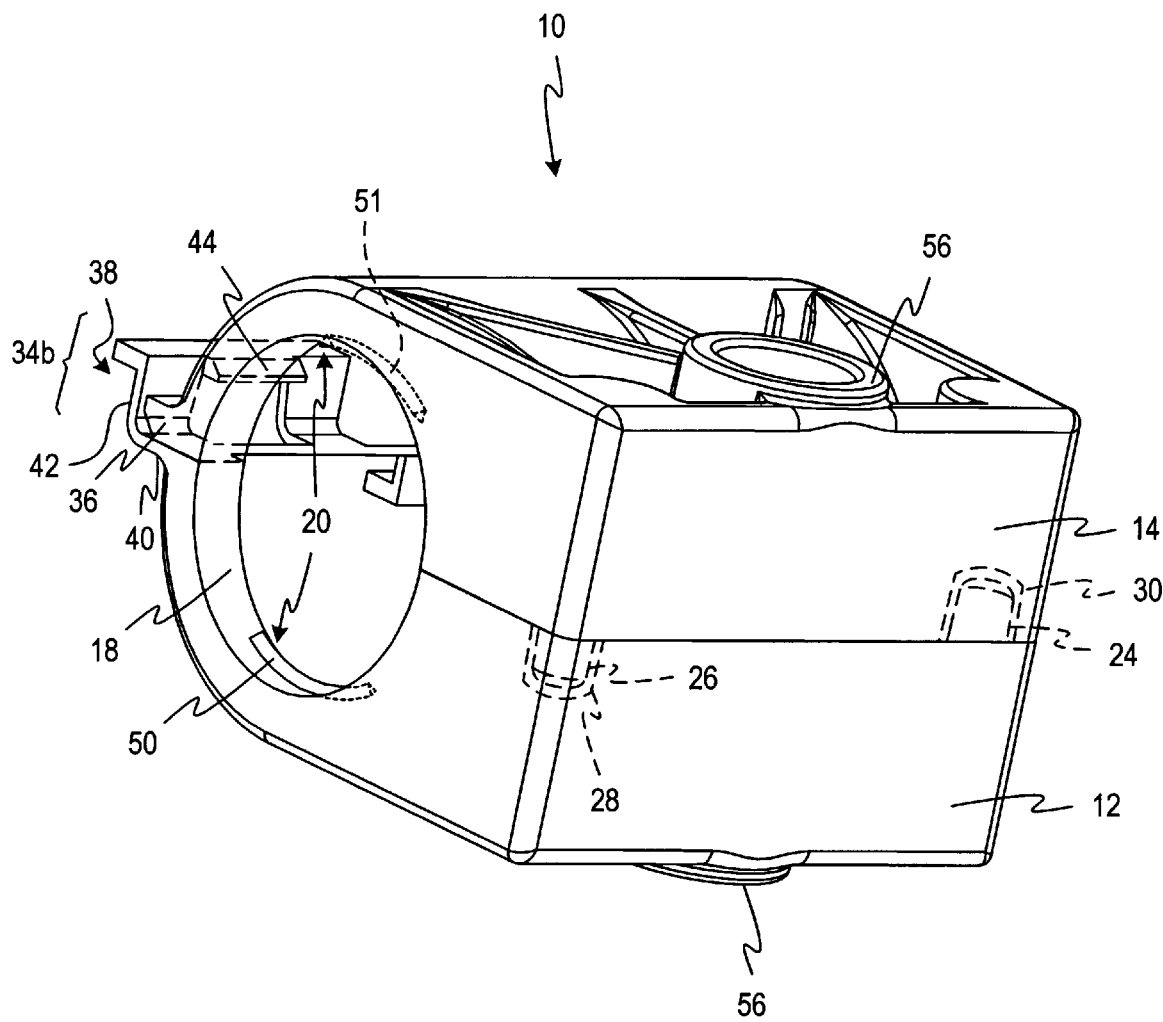
FIG. 3 is a perspective view of the assembled hanger of FIG. 2.

The claimed hanger includes several unique features that minimize the clamping stress between the hanger and the transmission line, inhibit hanger deformation, reduce longitudinal movement of the transmission line with respect to the hanger, allow a range of corrugated transmission line diameters to be accommodated, and reduce the complexity of installing the claimed hangers.

The "Gripping Ribs"

The claimed hanger includes two opposing sections that, when assembled together, surround the transmission line, but do not clamp the transmission line. Instead, two gripping ribs are disposed at respective ends of the hanger and are spaced to protrude into corresponding recesses in the corrugated transmission line to inhibit longitudinal movement of the transmission line with respect to the hanger. "Inhibit", as used herein, means to reduce, not necessarily prevent. Thus, the claimed hanger reduces longitudinal movement of the transmission line with respect to the hanger. However, because the hanger does not rely on clamping force between the hanger sections to secure the transmission line in the longitudinal direction, the claimed design significantly reduces the stress build-up in the hanger. Hanger stress causes deformation and bulging of the hanger sections and reduces the life of the hanger.

The claimed design spaces the gripping ribs so they fit in the recesses of the corrugated outer surface of the transmission line jacket. Thus, the inner diameter of the gripping ribs is less than the diameter of the crests of the corrugated jacket and greater than the diameter of the recesses of the corrugated jacket. This gives the hanger the ability to accommodate transmission line diameters approximately five percent greater than the inner diameter of the hanger.

Having two gripping ribs disposed at respective ends of the hanger concentrates the forces between the opposing hanger sections at two discrete points. This enhances the strength of the claimed hanger design by minimizing the likelihood that the two hanger sections will separate under changing environmental conditions.

The gripping ribs also simplify the installation process by reducing the clamping stress between the hanger sections and the transmission line. The hanger sections are not forced apart by the transmission line during installation because the claimed hanger does not tightly clamp the transmission line to secure it. Rather, the gripping ribs are spaced to fit into the recesses of the corrugated transmission line.

The "Snap Clasp"

In addition, the claimed design includes a "snap clasp" that controls any deformation caused by forces between the transmission line and the hanger gripping ribs or by imbedded stresses.

The most common failure of prior hangers is the tendency for the two hanger halves to separate over time and thus lose their grip on the transmission line. Prior hangers tend to deform over the life of the product due to imbedded forces and forces between the transmission line and the hanger. The claimed hanger, over approximately the same amount of time, is less likely to open and lose grip because it is restricted from opening by virtue of the snap clasp. The snap clasp is designed to restrict the deflection of the hanger if the hanger is expanded beyond intended limits. Consequently, the gripping ribs and the snap clasp reduce deformation caused by forces or interference between the transmission line and the hanger and, at the same time, limit the amount of deformation caused by imbedded forces.

The "Alignment Pins"

The claimed design further includes alignment pins which help the hanger withstand harsh environmental conditions and facilitate easy installation. The snap clasp and the alignment pins unitize the claimed hanger when abuses such as vibration, icing, wind loading, heat/cold cycling, moisture cycling, etc. occur. Specifically, the alignment pins help the two hanger sections to function as a unit. In one embodiment, each hanger section includes one alignment pin and one mating recess. The pin of the first section fits into and aligns with the recess in the second section, and vice versa.

The alignment pins facilitate easy installation because when the two sections are brought together, the pin on each section mates with the corresponding recess on the other section to properly align the hanger sections. The snap clasp and the alignment pins allow an installer to easily align and keep the two hanger sections together while tightening the hanger fastener. This allows the installer to easily secure the two sections together and fasten the hanger to the supporting structure.

Prior hangers generally use a bolt and a nut to fasten the two hanger halves together. Thus, prior hangers require the installer to tighten a nut and bolt fastener while trying to align and hold the two hanger halves together while tightening the fastener. However, it takes two hands just to tighten the bolt and restrict rotation of the nut. A third hand is required to align the two hanger halves with respect to each other.

In the claimed hanger, the installer does not have to hold three or more items with only two hands. Instead, the snap clasp and alignment pins allow the installer to easily align and keep the two hanger sections together while tightening the hanger fastener. Therefore, the claimed hanger allows the installer to use two hands to tighten the hanger fastener instead of trying to align and squeeze the two sections around the transmission line while trying to tighten the fastener. Specifically, the installer can restrain the nut from rotating with one hand while tightening the bolt with the other hand. This simplified installation procedure is a valuable benefit because properly installed hangers are more reliable. Safety is also improved since it is much less likely that the installer will drop wrenches or other tools from dangerous heights as a result of struggling with a difficult to install hanger. Therefore, because the claimed hanger simplifies the installation process, reliability, repeatability and safety are all improved.

The simplified installation procedure proceeds as follows. First, one of the hanger sections is positioned in proximity to the support member. Next, the transmission line is aligned along the generally cylindrical surface of the hanger section. The pins and recesses are used to align the first and second sections. Then, the two sections are brought together and the snap clasp is snapped together, enclosing the transmission line therebetween. The hanger is then attached to a supporting structure by inserting a fastener through the fastener opening and tightening the fastener.

Construction of the Hanger

In one embodiment, the claimed hanger consists of two identical molded plastic sections that are assembled to form the hanger. The snap clasp, gripping ribs and alignment pins combine to limit the amount of deflection the two hanger sections can experience. The hanger includes a fastener hole disposed through the two sections that allows a fastener such as a bolt, screw, etc. to penetrate through the entire assembled to hold the cable in place on a supporting structure. The hangers of the present invention are preferably stackable. This allows installation flexibility, ease of storage and efficient transportation. Because the hangers are stackable, multiple transmission lines may be held together by stacking a plurality of hangers one on top of the other. The multiple transmission lines are held in place on a supporting structure by using one sufficiently long fastener.

In addition, the claimed hanger is preferably composed of two identical and interchangeable sections. Several advantages flow from the use of hangers composed of identical halves. First, such hangers are more economical to manufacture, they only require a single mold. Second, they are easy to order and distribute. Finally, the sections are interchangeable. This makes installation easier for the installer.

The hanger sections are also re-usable. The sections can be readily disassembled by loosening the fastener and un-snapping the snap clasps. Thus, the hanger can be used in other locations and/or installations.

In summary, the claimed hanger includes several unique features. The gripping ribs reduce the need to tightly clamp the transmission line; thus, they help reduce stress in the plastic hanger sections despite a range of transmission line diameters being accommodated. The snap clasp is designed to limit the deformation which can occur over time as a result of the claimed hanger being able to accommodate a range of transmission line diameters. The snap clasp is also designed to limit deformation due to environmental variations. The alignment pins keep the two mating sections aligned with respect to each other thus facilitating the installation process. Therefore, these unique features make the claimed hanger more reliable over time and simpler to install.

DETAILED DESCRIPTION OF ILLUSTRATIVE EMBODIMENTS

The claimed hanger may be used to support a variety of types and sizes of transmission lines including corrugated coaxial cable transmission line having a variety of cross sectional shapes. For the purposes of illustration, the preferred embodiment of the present invention is shown in the drawings in conjunction with the preferred use, i.e., to support a corrugated coaxial cable with a circular cross section.

Figure 4:
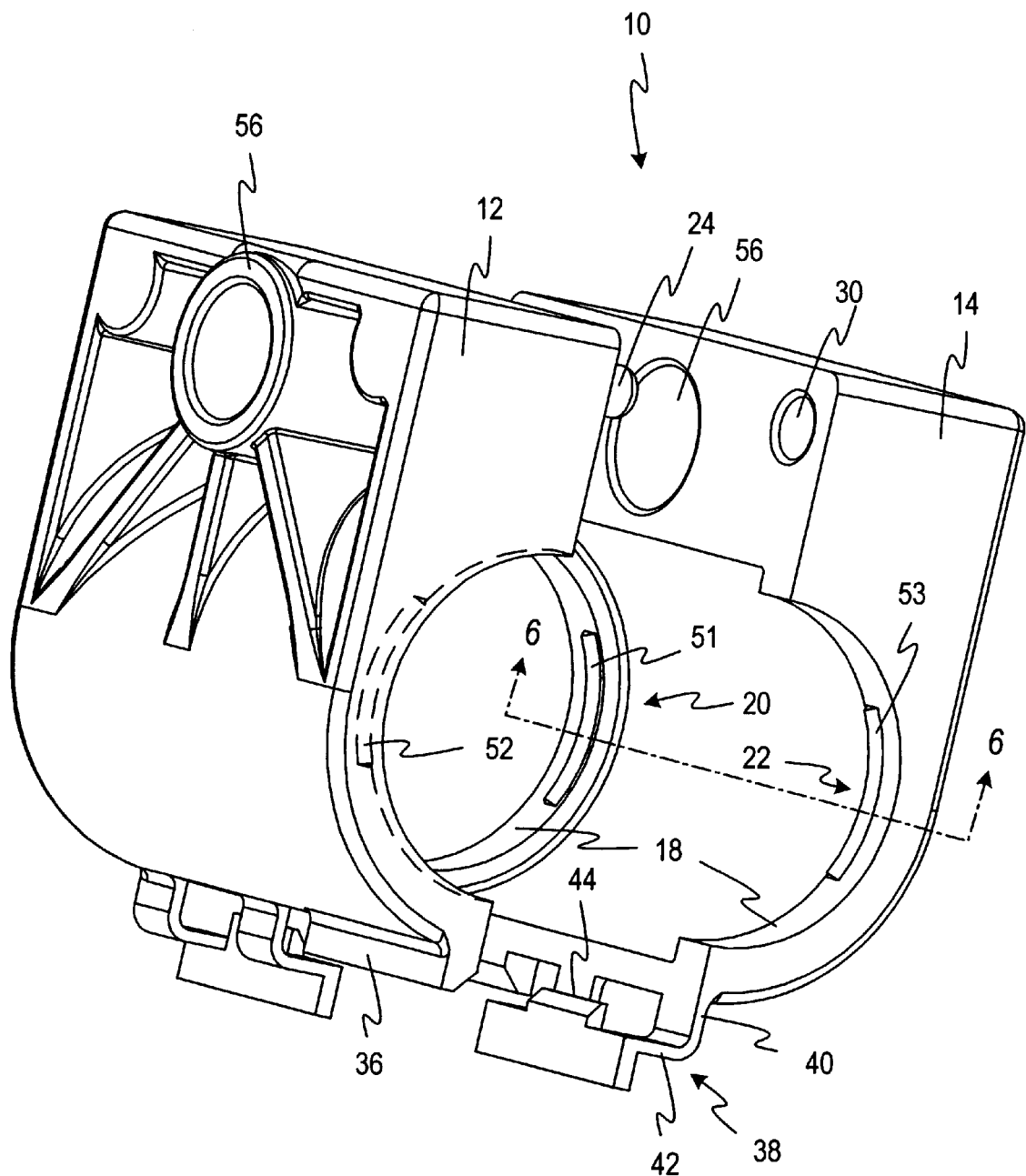
FIG. 4 is a rotated exploded perspective view of the hanger of FIG. 2.
Figure 5:
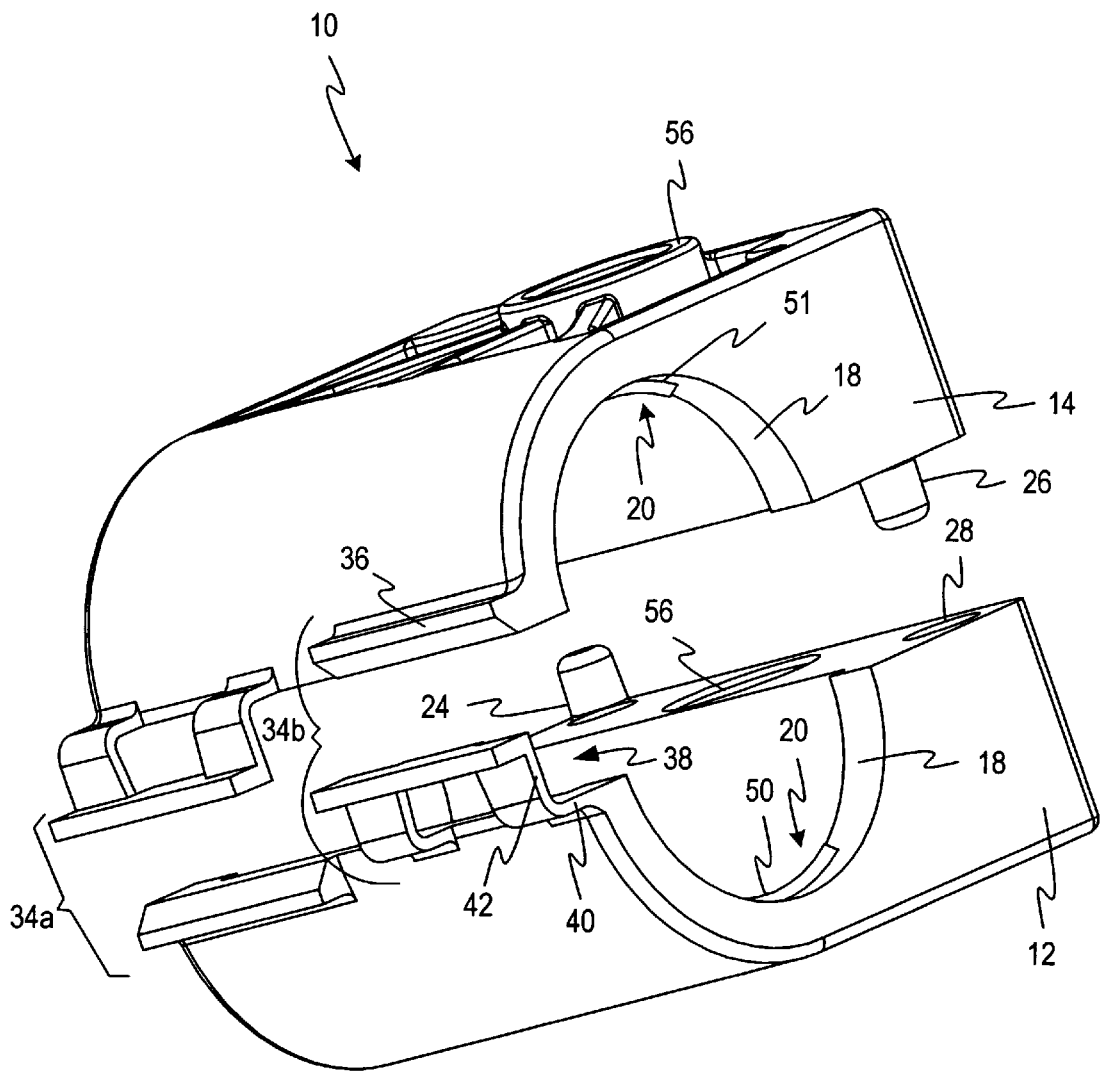
FIG. 5 is a rotated exploded perspective view of the hanger of FIG. 2.

The present invention will now be described in connection with the drawings. FIGS. 2–5 illustrate a hanger 10 that includes a first section 12 and a second section 14 constructed in accordance with the present invention. In one embodiment, the sections 12 and 14 are structurally identical. The assembled hanger 10 has an inner generally cylindrical surface 18 having a circumference. Corrugated transmission lines have two diameters, an inner diameter measured between opposing recesses and an outer diameter measured between opposing crests. The generally cylindrical surface 18 is substantially the same diameter as the maximum outer diameter transmission line the hanger is expected to support. The inner generally cylindrical surface 18 includes a first gripping rib 20 and a second gripping rib 22 disposed at respective ends of the hanger 10, as illustrated in FIG. 4. Each of the gripping ribs 20 and 22 include a protrusion extending radially inward from the inner generally cylindrical surface 18. The gripping ribs 20 and 22 are longitudinally spaced with respect to each other such that, when the transmission line is inserted into the hanger, each of the gripping ribs 20 and 22 fit in a corresponding recess of the corrugated outer surface of the transmission line. The hanger thus inhibits longitudinal movement of the transmission line without having to tightly clamp the transmission line between the hanger sections. This significantly reduces hanger stress which is a cause of hanger deformation. Minimizing hanger stress also increases the life of the hanger.

Figure 6:
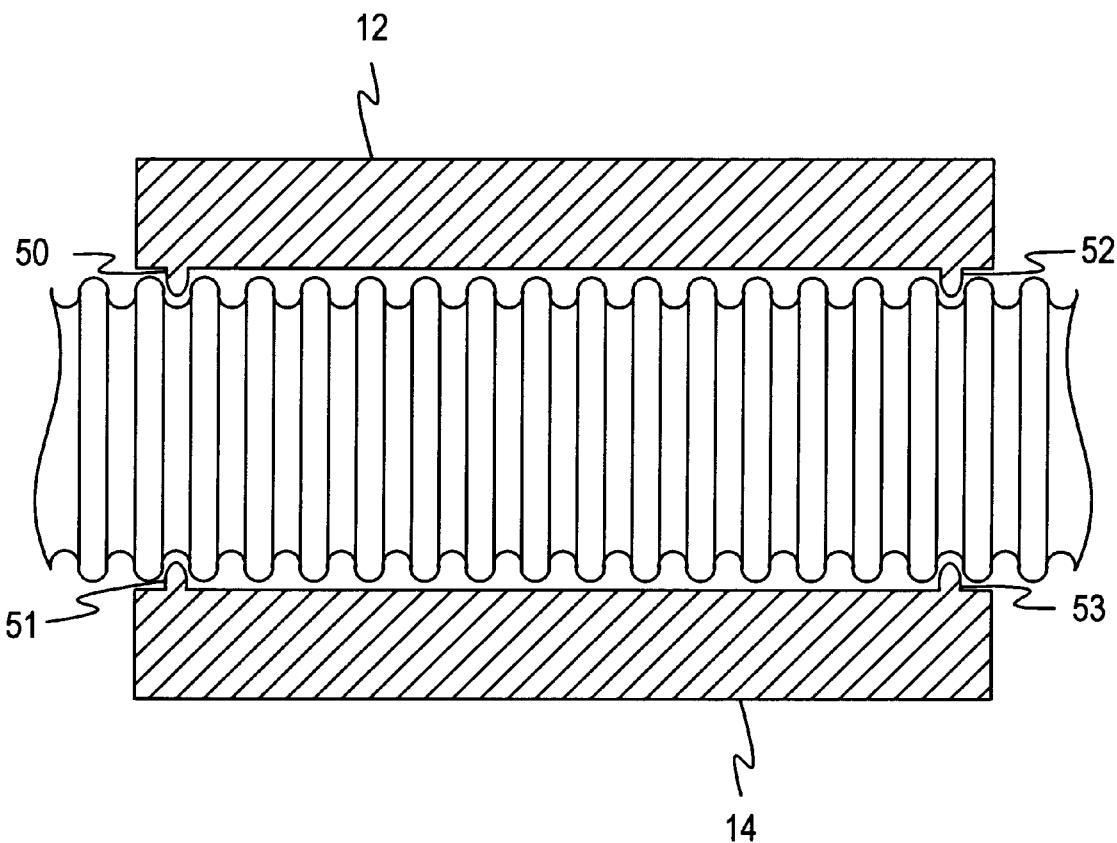
FIG. 6 is a cross-sectional view taken along line 6—6 in FIG. 4 of the assembled hanger of FIG. 3 and a corrugated transmission line.
Figure 7:
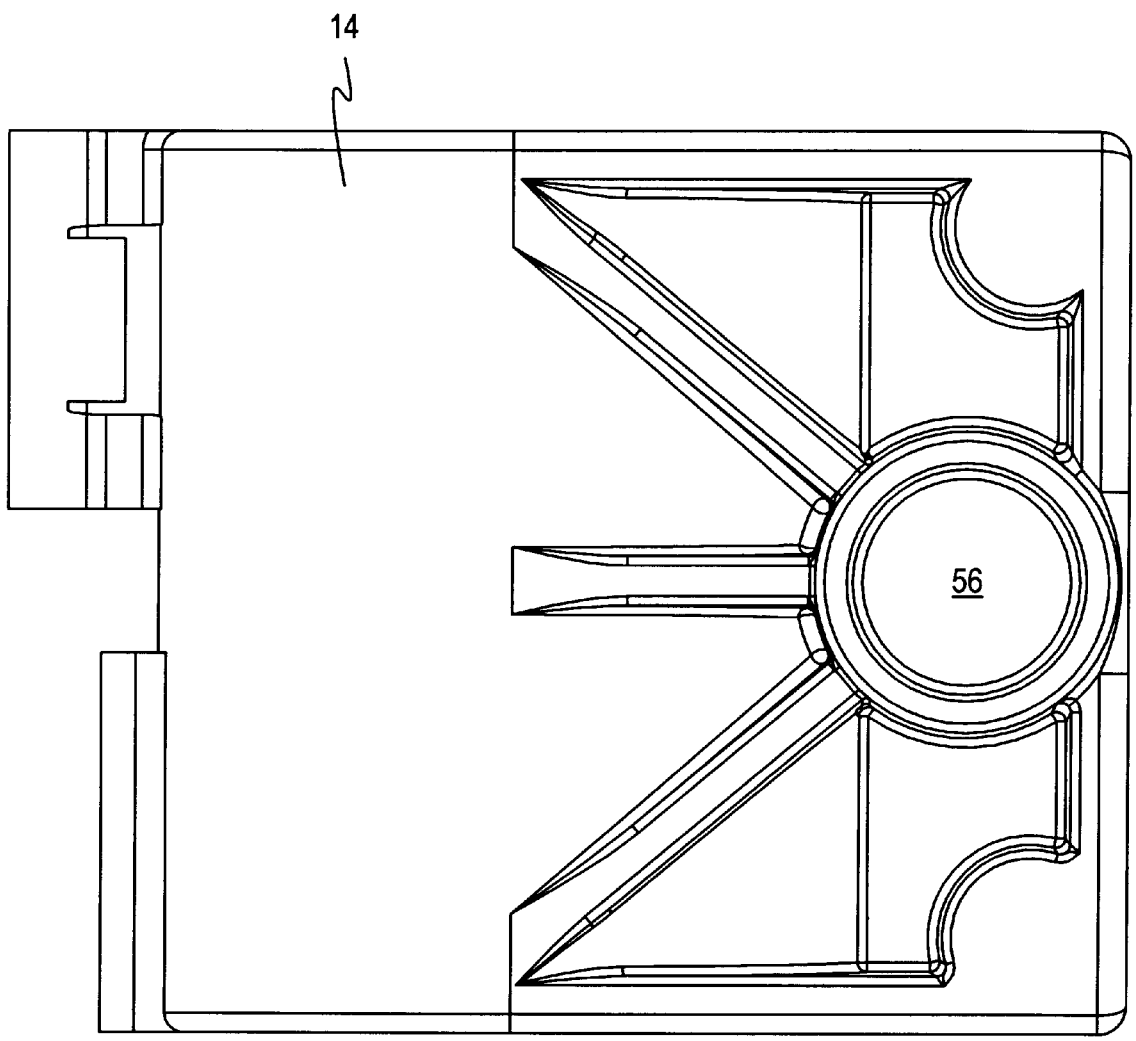
FIG. 7 is a to view of the second section of the hanger of FIG. 2.

In one embodiment, the inwardly extending protrusion of each gripping rib 20 and 22 comprises a pair of opposing gripping sections 50, 51 and 52, 53, respectively, that each define approximately a quarter of the circumference of the inner generally cylindrical surface 18, as illustrated in FIGS. 4 and 6. The gripping sections 50, 51 are longitudinally spaced with respect to the gripping sections 52, 53 such that, when the transmission line is inserted into the hanger, each of the gripping sections 50, 51 and 52, 53 fit in corresponding recesses in the corrugated outer surface of the transmission line, as illustrated in FIG. 6. In this embodiment, the opposing pairs of gripping sections 50, 51 and 52, 53 are vertically aligned with respect to each other to accommodate an annularly corrugated transmission line. In another embodiment, each of the gripping ribs 20 and 22 are annular rings defining the entire circumference. As is well known to those familiar with this art, an "annularly" corrugated conductor is distinguished from a "helically" corrugated conductor in that the annular corrugations form a series of spaced parallel crests which are discontinuous along the length of the cable and, similarly, a series of spaced parallel recesses which are also discontinuous along the length of the cable, as illustrated in FIG. 6. That is, each crest and recess extends around the circumference of the conductor only once, until it meets itself, and does not continue in the longitudinal direction. Consequently, any transverse cross-section taken through the conductor perpendicular to its axis is radially symmetrical, which is not true of helically corrugated conductors. In an alternative embodiment, opposing pairs of the gripping sections 50, 51 and 52, 53 are offset with respect to each other for accommodating helically corrugated transmission lines.

Figure 8:
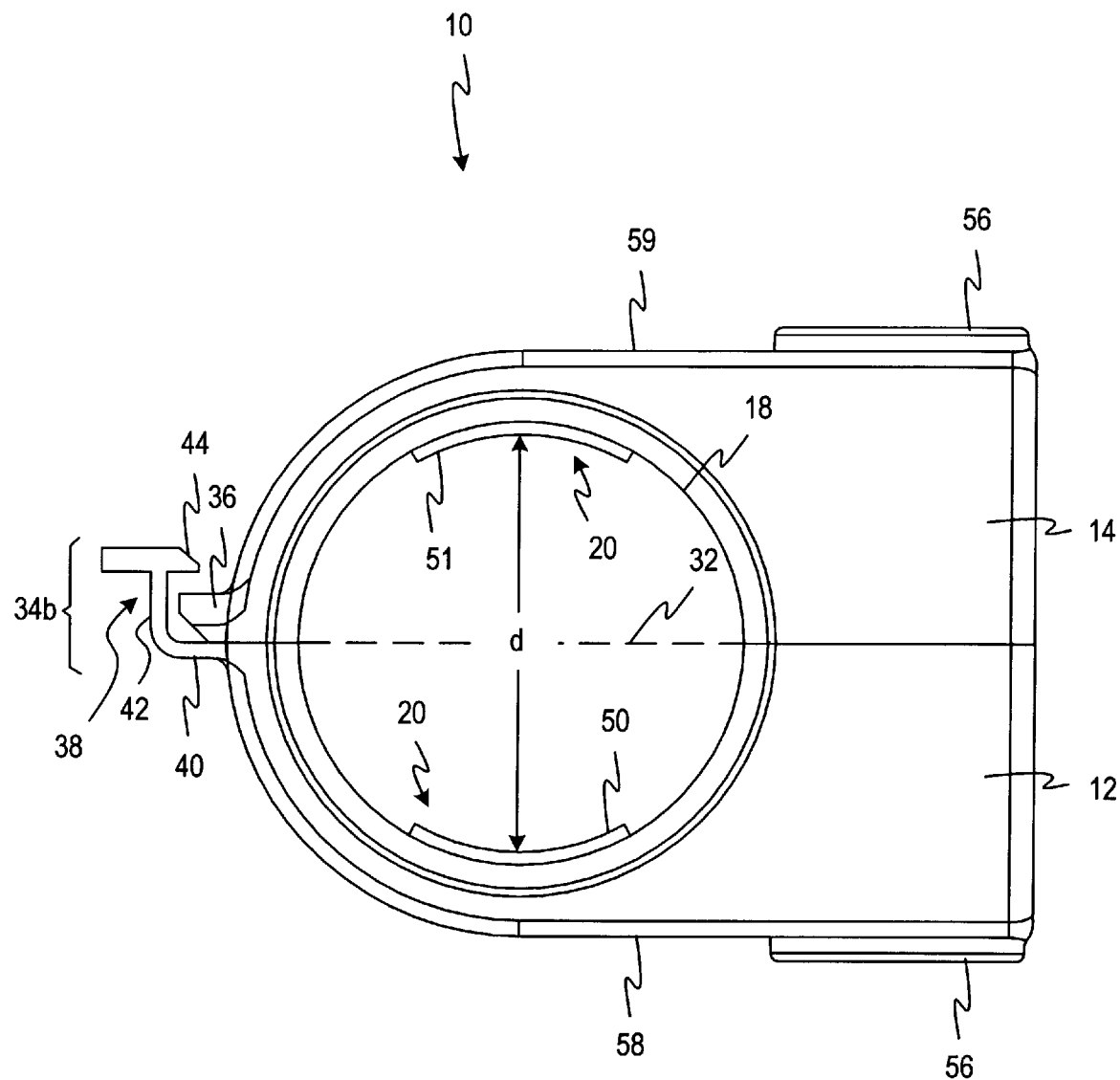
FIG. 8 is an end view of the assembled hanger of FIG. 3.

Each gripping rib 20 and 22 has an inner diameter d measured between the tips of opposing gripping rib protrusions, as illustrated in FIG. 8. The inner diameter d is equal to the diameter of the smallest inner diameter transmission line that the hanger is designed to accommodate. In one embodiment, the hanger 10 is designed to accommodate a transmission line having an inner diameter approximately equal to 1 inch. (Such a transmission line typically has an outer diameter approximately equal to 1.1 inches.)

In one embodiment, the first section 12 further includes a first alignment pin 24 and a first mating recess 28 (shown in phantom in FIGS. 2–3) disposed at respective ends of the section 12. Similarly, the second section 14 includes a second alignment pin 26 and a second mating recess 30 (shown in phantom in FIGS. 2–3) disposed at respective ends of the section 14. The second mating recess 30 is adapted to receive the first alignment pin 24 and the first mating recess 28 is adapted to receive the second alignment pin 26 to align the first section 12 with the second section 14.

The alignment pins 24 and 26 help the two hanger sections 12 and 14 function as a unit to withstand abuses such as vibration, icing, wind loading, heat/cold cycling, moisture cycling, etc. Thus, the alignment pins 24 and 26 secure the two hanger sections 12 and 14 together such that little or no movement can occur between the two hanger sections 12 and 14. This is especially important when high external and/or environmental forces are applied to the hanger. The alignment pins 24 and 26 also facilitate easily aligning the two hanger sections 12 and 14. When the two sections 12 and 14 are brought together, the alignment pin on each section mates with the corresponding recess on the opposing section to properly align the hanger sections 12 and 14.

In another embodiment, the first and second sections 12 and 14 are joined at a mating plane 32, illustrated in FIG. 8. Each section 12 and 14 further includes a pair of snap clasps 34a and 34b, illustrated in FIG. 5. Each of the snap clasps 34a and 34b include two elements. The first element is a lip 36 that extends from the exterior of the hanger 10. The lip 36 is coincident to and parallel with the mating plane 32. The second element is a latch 38 having three sides. The first side 40 extends from the hanger 10 at the mating plane. The second side 42 is generally orthogonal to the first side 40 and extends therefrom. The third side 44 is generally orthogonal to the second side 42 and extends therefrom. The third side 44 acts as a latch member, best illustrated in FIG. 2. The lip 36 of each snap clasp 34a and 34b is adapted to mate with the corresponding latch 38 to snap the first and second sections 12 and 14 together and secure the transmission line therebetween. To close the hanger 10, the lip 36 of each snap clasp 34a and 34b is snapped past the corresponding latch member 44.

In this embodiment, the length of the second side 42 is the difference between the largest diameter and the smallest diameter transmission line that the hanger 10 is designed to accommodate plus the thickness of the lip 36. In one aspect of this embodiment, the length l of the second side 42 (illustrated in FIG. 2) is approximately 4.5 mm. The two snap clasps 34a and 34b are no longer than half the length of the hanger 10. The snap clasps 34a and 34b limit the deformation caused by oversized transmission lines, imbedded stresses, environmental variations and help prevent the hanger 10 from opening and losing its grip on the transmission line. In addition, the snap clasps 34a and 34b allow the hanger 10 to accommodate a range of transmission line diameters.

In a further embodiment, the first and second sections 12 and 14 are structurally identical. Thus, the hanger 10 is more economical to manufacture because each section only requires a single mold. Identical sections are also easier to order and distribute. Moreover, installers need not be concerned about having to select the proper "top" or "bottom" section during installation.

In one embodiment, the hanger 10 includes two sections 12 and 14 that are made from molded plastic, most preferably from black polypropylene, i.e., polypropylene which contains carbon black for protection of the plastic from UV light. One advantage of using black polypropylene for making the hanger 10 is its low cost and ready availability as a commodity resin. Another advantage is its strength and relatively low creep when subjected to stresses over a prolonged period of time. An alternative material for manufacturing the hanger 10 is a non-halogenated fire-retardant plastic. Such plastic is especially useful for indoor and tunnel applications.

The two hanger sections 12 and 14 are preferably made into unitary molded plastic parts by injection molding. The hanger sections 12 and 14 are preferably relatively thin-walled structures constructed with appropriate reinforcing ribs, for an optimum combination of strength, low weight, manufacturability and low cost.

In one embodiment, the hanger sections 12 and 14 are joined by a fastener (not shown). The fastener is disposed through the first and second sections 12 and 14 in a fastener hole 56. The fastener secures the transmission line between the first and second sections 12 and 14 and secures the hanger 10 to the supporting structure. The fastener may comprise a bolt, screw or other threaded member and associated washer(s) and nut(s). Where the fastener comprises a bolt, the bolt is inserted through the fastener hole 56, through the first and second sections 12 and 14, through the supporting structure, and a nut is secured to the distal end of the bolt. Where the fastener comprises a screw, the fastener hole 56 is threaded and the screw is screwed into the fastener hole 56, through the hanger 10, and into the supporting structure. Where the fastener comprises a threaded rod, the rod is inserted through the fastener hole 56 and through the first and second sections 12 and 14. The rod is then clamped to the supporting structure and washer(s) and nut(s) secure the hanger together.

In a further embodiment, the hanger 10 is stackable to accommodate a plurality of parallel transmission lines. Thus, a first one of the hangers 10 may be stacked on a second one of the hangers 10. In this way, two or more transmission lines can be secured to the same supporting structure. Specifically, the first section 12 of the first section 12 of the first hanger 10 is stacked on the second section 14 of the second hanger 10, and so on. Adjacent hanger sections do not interlock. Rather, the top and bottom portions of the fastener hole 56 protrude outwardly from the horizontal planes 58 and 59 on respective sections 12 and 14, as illustrated in FIG. 8. This allows the sections 12 and 14 of adjacent hangers 10 to rotate with respect to each other when multiple transmission lines are stacked using two or more hangers 10. Allowing the sections 12 and 14 to rotate with respect to each other minimizes hanger stress and allows transmission lines that are not exactly parallel to be supported on the same supporting structure. The protruding portions of the fastener hole 56 also allow clearance for any flexing required to contain a cable with an inner diameter greater than d; as illustrated in FIG. 8.

In order to secure a transmission line to a supporting structure, an installer first places a first hanger section 12 and a second hanger section 14 around the transmission line and aligns the first and second sections 12 and 14 with respect to each other such that the transmission line is disposed therebetween. The two sections 12 and 14 are easily aligned by aligning the first alignment pin 24 with the second mating recess 30 and aligning the second alignment pin 26 with the first mating recess 28. The gripping ribs 20 and 22 on the first section 12 are fitted into corresponding recesses in the corrugated outer surface of the transmission line. The installer then brings the second section 14 toward the first section 12 and fits the gripping ribs 20 and 22 on the second section 14 into corresponding recesses in the corrugated transmission line. Next, the installer snaps the latch 38 over the lip 36 to form the hanger 10. The installer then inserts a fastener through the fastener hole 56 to secure the transmission line between the first and second sections 12 and 14 and to secure the hanger 10 to the supporting structure. Where the fastener comprises two members, such as a nut and a bolt, the hanger 10 allows the installer to use one hand to tighten the bolt while using the other hand to hold the nut from rotating. Specifically, the alignment pins 24, 26 and the snap clasps 34a and 34b allow the installer to easily align and keep together the first and second sections while securing the hanger to the supporting structure.

The installer may then secure a second transmission line to the same supporting structure by stacking a second hanger 10 on the first hanger 10. This is accomplished by stacking the first section 12 of the first hanger 10 on the second section 14 of the second hanger 10. This process is repeated in order to secure a plurality of transmission lines to the same supporting structure.

Thus, the claimed hanger is able to accommodate a relatively large number of transmission line diameters, minimize the clamping stress between the hanger and the transmission line, inhibit hanger deformation, reduce longitudinal movement of the transmission line with respect to the hanger, and facilitate easy installation.

The above detailed description of the various embodiments of the present invention is for illustrative purposes only and it is not intended to limit the present invention in any manner. Other aspects, features, advantages and modifications of the present invention will become apparent to those skilled in the art upon studying this invention. All such aspects, features, advantages and modifications of the present invention are intended to be within the scope of the present invention as defined by the claims.

What is claimed is:

1. A transmission line hanger for attaching a transmission line to a supporting structure, the transmission line having a corrugated outer surface with a first side and a second side, said first side being opposite to said second side, said hanger comprising:

a first section adapted to engage the first side of the transmission line;

a second section adapted to engage the second side of the transmission line, said first and second sections forming said hanger, an inner generally cylindrical surface including two gripping ribs disposed at respective ends of said hanger, each of said gripping ribs including a protrusion extending radially inward from said inner generally cylindrical surface, said gripping ribs being spaced with respect to each other such that each of said gripping ribs is adapted to fit into a corresponding recess of said corrugated outer surface of said transmission line.

2. The hanger of claim 1, wherein said gripping ribs are adapted to inhibit longitudinal movement of said transmission line in said hanger.

3. The hanger of claim 1, wherein each gripping rib has an inner diameter, said inner diameter being the same diameter as the smallest inner diameter corrugated transmission line that said hanger is designed to accommodate.

4. The hanger of claim 1, wherein said gripping ribs are annular rings.

5. The hanger of claim 1, wherein said first and second sections are structurally identical.

6. The hanger of claim 1, wherein said first and second sections are unitary molded plastic parts.

7. The hanger of claim 1, further including a fastener, said fastener being adapted to extend through said first and second sections to secure said transmission line therebetween and to secure said hanger to said supporting structure.

8. The hanger of claim 7, wherein said fastener comprises a bolt.

9. The hanger of claim 7, wherein said fastener comprises a screw.

10. The hanger of claim 7, wherein said fastener comprises a threaded member, a washer and a nut.

11. The hanger of claim 1, wherein said gripping ribs are adapted to inhibit longitudinal movement of said transmission line in said hanger.

12. The hanger of claim 1, further including a latch and a lip, said latch adapted to mate with said lip to snap said first and second sections together and secure said transmission line therebetween.

13. The hanger of claim 1, further including a snap clasp.

14. The hanger of claim 13, wherein said snap clasp includes two elements, the first element being a lip on the exterior of said hanger, said lip being coincident to and parallel with said mating plane, the second element being a latch having three sides, the first side extending from said exterior of the hanger at the mating plane, the second side being generally orthogonal to the first side and extending therefrom, the third side being generally orthogonal to the second side and extending therefrom to form a latch member, said lip adapted to mate with said latch to snap said first section and said second section together and secure said transmission line therebetween, the lip being adapted to snap past the latch member as the hanger is closed.

15. The hanger of claim 14, wherein the length of said second side of said latch is the difference between the largest diameter and the smallest diameter that the hanger is designed to accommodate plus the thickness of said lip.

16. The hanger of claim 1, wherein said hanger includes two snap clasps, each snap clasp being no more than half the length of said hanger.

17. The hanger of claim 1, wherein said first section includes an alignment pin and a mating recess.

18. The hanger of claim 1, wherein said first section includes a first alignment pin and a first mating recess, said second section includes a second alignment pin adapted to fit in said first mating recess and a second mating recess adapted to receive said first alignment pin to align said first section with said second section.

19. The hanger of claim 1, wherein said inner generally cylindrical surface has a circumference, each of said gripping ribs including gripping sections that define approximately a quarter of said circumference.

20. The hanger of claim 19, wherein opposing pairs of said gripping sections vertically aligned with respect to each other to accommodate an annularly corrugated transmission line.

21. A method for securing a transmission line to a supporting structure, the transmission line having a corrugated outer surface, said method comprising the steps of:

placing a first hanger section and a second hanger section around said transmission line, said first section including a lip on the exterior of said hanger, said second section including a snap latch;

aligning said second hanger section with respect to said first hanger section such that said transmission line is disposed therebetween;

bringing the first and second sections toward each other until said snap latch engages said lip to form an assembled hanger having an inner generally cylindrical surface including two gripping ribs disposed at respective ends of said hanger;

fitting each of said gripping ribs into a corresponding recess of said corrugated outer surface of said transmission line; and securing said hanger to said supporting structure.

22. The method of claim 21, wherein said first hanger section includes a first alignment pin and a first mating recess, said second hanger section including a second mating recess and a second alignment pin, and further including the steps of aligning said first alignment pin with said second mating recess, and aligning said second alignment pin with said first mating recess.

23. The method of claim 21, wherein said first and second sections are structurally identical.

24. The method of claim 21, further including the step of inserting a fastener through said first and second sections to secure said transmission line therebetween and to secure said hanger to said supporting structure.

25. A transmission line hanger for attaching a transmission line to a supporting structure, the transmission line having a corrugated outer surface, said hanger comprising:

a first section adapted to engage a first side of the transmission line;

a second section adapted to engage a second side of the transmission line, said first and second sections forming said hanger, an inner generally cylindrical surface including a first pair of opposing gripping sections and a second pair of opposing gripping sections, said first and second pair of gripping sections being disposed at respective ends of said hanger, each of said gripping sections including a protrusion extending radially inward from said inner generally cylindrical surface, said first and second pair of gripping sections being longitudinally spaced with respect to each other such that each of said gripping sections is adapted to fit into a corresponding recess in said corrugated outer surface of said transmission line.

26. The hanger of claim 25, further including a fastener, said fastener being adapted to extend through said first and second sections to secure said transmission line therebetween and to secure said hanger to said supporting structure.

27. The hanger of claim 25, wherein said inner generally cylindrical surface has a circumference, said gripping sections defining approximately a quarter of said circumference.

28. The hanger of claim 25, wherein said first pair of opposing gripping sections are vertically aligned with respect to each other to accommodate an annularly corrugated transmission line.

29. The hanger of claim 25, wherein said first pair of opposing gripping sections are vertically aligned with respect to each other to accommodate a helically corrugated transmission line.

30. The hanger of claim 25, further including a latch and a lip, said latch adapted to mate with said lip to snap said first and second sections together and secure said transmission line therebetween.

31. The hanger of claim 25, wherein said hanger includes two snap clasps, each snap clasp being no more than half the length of said hanger.

32. The hanger of claim 25, wherein said first section includes an alignment pin and a mating recess.

33. The hanger of claim 25, wherein said first section includes a first alignment pin and a first mating recess, said second section includes a second alignment pin adapted to fit in said first mating recess and a second mating recess adapted to receive said first alignment pin to align said first section with said second section.

34. One or more transmission line hangers for attaching a transmission line to a supporting structure, the transmission line having a corrugated outer surface with a first side and a second side, said first side being opposite to said second side, each hanger comprising:

a first section adapted to engage the first side of the transmission line;

a second section adapted to engage the second side of the transmission line, said first and second sections forming said hanger;

an inner generally cylindrical surface including two gripping ribs disposed at respective ends of said hanger, each of said gripping ribs including a protrusion extending radially inward from said inner generally cylindrical surface, said gripping ribs being spaced with respect to each other such that each of said gripping ribs is adapted to fit into a corresponding recess of said corrugated outer surface of said transmission line.

35. The hanger of claim 34, wherein a first one of said hangers is stackable on a second one of said hangers such that joining the two hangers results in said first section of said first hanger being stacked on said second section of said second hanger.

36. A transmission line hanger, having a first side and a second side, for attaching a transmission line to a supporting structure, said hanger comprising:

a first section adapted to engage a first side of the transmission line;

a second section adapted to engage a second side of the transmission line, said first and second sections forming said hanger, at least two snap clasps disposed on said first side of said hanger, each snap clasp including a lip on the exterior of said hanger, said lip being coincident to and parallel with said mating plane, and a latch having three sides, the first side extending from said exterior of the hanger at the mating plane, the second side being generally orthogonal to the first side and extending therefrom, the third side being generally orthogonal to the second side and extending therefrom to form a latch member, said lip being adapted to mate with said latch to snap said first section and said second section together and secure said transmission line therebetween, said snap clasp being configured to limit hanger deformation and help prevent said hanger from opening and losing its grip on said transmission line, said length of said second side being sufficient to allow said hanger to accommodate a range of transmission line diameters.

37. The hanger of claim 36, further including an inner generally cylindrical surface including two gripping ribs disposed at respective ends of said hanger, each of said gripping ribs including a protrusion extending radially inward from said inner generally cylindrical surface, said gripping ribs being spaced with respect to each other such that each of said gripping ribs is adapted to fit into a corresponding recess of said corrugated outer surface of said transmission line.

38. The hanger of claim 36, wherein said lip is adapted to snap past the latch member as the hanger is closed.

39. The hanger of claim 36, wherein said latch member consists of one unitary extension generally orthogonal to said second side.

40. The hanger of claim 36, wherein said hanger includes two snap claps, each snap clasp being no more than half the length of said hanger.

41. The hanger of claim 36, wherein said first section includes an alignment pin and a mating recess each disposed on said second side of said hanger.

42. The hanger of claim 36, wherein said first section includes a first alignment pin and a first mating recess each disposed on said second side of said hanger, said second section includes a second alignment pin adapted to fit in said first mating recess and a second mating recess adapted to receive said first alignment pin to align said first section with said second section.

* * * * *